(12) United States Patent
Yoshikawa et al.

(10) Patent No.: US 11,437,879 B2
(45) Date of Patent: Sep. 6, 2022

(54) BUS-BAR UNIT AND MOTOR

(71) Applicant: Nidec Corporation, Kyoto (JP)

(72) Inventors: Masanori Yoshikawa, Kyoto (JP);
Yusaku Yoshida, Kyoto (JP); Hideo Fujiwara, Kyoto (JP); Takashi Seguchi, Kyoto (JP); Kosuke Ogawa, Kyoto (JP)

(73) Assignee: NIDEC CORPORATION, Kyoto (JM)

( * ) Notice: Subject to any disclaimer, the term of this patent is extended or adjusted under 35 U.S.C. 154(b) by 304 days.

(21) Appl. No.: 16/636,041

(22) PCT Filed: Jul. 27, 2018

(86) PCT No.: PCT/JP2018/028250
§ 371 (c)(1),
(2) Date: Feb. 3, 2020

(87) PCT Pub. No.: WO2019/064878
PCT Pub. Date: Apr. 4, 2019

(65) Prior Publication Data
US 2021/0152044 A1 May 20, 2021

(30) Foreign Application Priority Data
Sep. 29, 2017 (JP) .............................. JP2017-190056

(51) Int. Cl.
*H02K 3/52* (2006.01)
*H02K 21/16* (2006.01)
*B62D 5/06* (2006.01)

(52) U.S. Cl.
CPC ............. *H02K 3/522* (2013.01); *H02K 21/16* (2013.01); *B62D 5/064* (2013.01); *H02K 2203/09* (2013.01)

(58) Field of Classification Search
CPC .. H02K 3/28; H02K 3/50; H02K 3/52; H02K 2203/09
(Continued)

(56) References Cited

U.S. PATENT DOCUMENTS

2017/0222377 A1 8/2017 Sakurada
2017/0366060 A1 12/2017 Haberkorn et al.

FOREIGN PATENT DOCUMENTS

EP 3300218 A1 * 3/2018 ............. H02K 3/522
JP 2013-062901 A 4/2013
(Continued)

OTHER PUBLICATIONS

Official Communication issued in International Patent Application No. PCT/JP2018/028250, dated Oct. 2, 2018.

*Primary Examiner* — Quyen P Leung
*Assistant Examiner* — Minki Chang
(74) *Attorney, Agent, or Firm* — Keating & Bennett

(57) ABSTRACT

A bus-bar unit includes bus-bars and a bus-bar holder supporting the bus-bars. The bus-bar includes a first and a second bus-bar piece, including a plate. The first bus-bar piece includes a coil wire connecting portion connected to a coil wire drawn from a stator, and a first junction terminal joined to the second bus-bar piece. The second bus-bar piece includes an external connection terminal connected to an external device, a second junction terminal joined to the first bus-bar piece, and a second piece main body connecting them. The second piece main body has a first extension extending from the external connection terminal along a direction perpendicular or substantially perpendicular to the axial direction, a second extension extending from the second junction terminal along a direction perpendicular or substantially perpendicular to the axial direction, and a
(Continued)

crank portion located between them and bent in a crank shape in a plate thickness direction.

11 Claims, 8 Drawing Sheets

(58) Field of Classification Search
USPC .................................................. 310/179, 195
See application file for complete search history.

(56) References Cited

FOREIGN PATENT DOCUMENTS

| | | | |
|---|---|---|---|
| JP | 2019068506 A | * | 4/2019 |
| WO | 2014/057978 A1 | | 4/2014 |

* cited by examiner

BUS-BAR UNIT AND MOTOR

CROSS REFERENCE TO RELATED APPLICATIONS

This is a U.S. national stage of PCT Application No. PCT/JP2018/028250, filed on Jul. 27, 2018, and priority under 35 U.S.C. § 119(a) and 35 U.S.C. § 365(b) is claimed from Japanese Application No. 2017-190056, filed Sep. 29, 2017; the entire disclosures of each application being hereby incorporated herein by reference.

1. FIELD OF THE INVENTION

The present disclosure relates to a bus-bar unit and a motor.

2. BACKGROUND

In a related art, a conventional bus-bar unit is known. The bus-bar unit is provided with a plurality of bus-bars. The bus-bar has a terminal (external connection terminal) connected to an external device and a connection part (coil wire connection part) connected to a coil wire drawn from a stator.

The bus-bar provided in such a bus-bar unit requires routing in a complicated shape between the external connection terminal and the coil wire connection part. For this reason, when the bus-bar was formed by press working, it is difficult to increase the number of pieces taken from a plate material such that there has been a problem that the manufacturing cost increases.

The present inventors have earnestly studied and discovered that the number of bus-bars as a whole can be increased by separately forming a member having an external connection terminal and a member having a coil wire connection part and jointing these members. In this case, when the external connection terminal is connected to an external device, a load is transmitted to the junction, so there is a concern that the junction is damaged.

SUMMARY

A bus-bar unit according to an example embodiment of the present disclosure is a bus-bar unit provided at an upper side of a stator with an annular or substantially annular shape around a central axis extending in a vertical direction, and is provided with a plurality of bus-bars and a bus-bar holder supporting the bus-bars. Each of the plurality of bus-bars includes a first bus-bar piece and a second bus-bar piece. The first bus-bar piece includes a coil wire connection portion connected to a coil wire drawn from the stator, and a first junction terminal joined to the second bus-bar piece. The second bus-bar piece includes an external connection terminal connected to an external device, a second junction terminal joined to the first bus-bar piece, and a second piece main body connecting the external connection terminal and the second junction terminal. The second bus-bar piece includes a plate. The second piece main body includes a first extension extending from the external connection terminal along a direction perpendicular or substantially perpendicular to the axial direction, a second extension extending from the second junction terminal along a direction perpendicular or substantially perpendicular to the axial direction, and a crank portion located between the first extension and the second extension and bent in a crank shape or substantially a crank shape in a plate thickness direction.

A motor according to an example embodiment of the present disclosure includes the above-described bus-bar unit, and is provided with the stator and a rotor facing the stator in a radial direction via a gap.

The above and other elements, features, steps, characteristics and advantages of the present disclosure will become more apparent from the following detailed description of the example embodiments with reference to the attached drawings.

DETAILED DESCRIPTION

Hereinafter, motors according to example embodiments of the present disclosure will be described with reference to the drawings. In addition, the scope of the present disclosure is not limited to the following example embodiments, and may be arbitrarily modified within the technical spirit of the present disclosure. Furthermore, in the following drawings, in order to make each configuration be easily understood, there is a case in that the scale, the number, etc., of the actual structure may differ from those of each structure.

A Z axis is appropriately shown in each drawing. A Z-axial direction in each drawing is a direction parallel to an axial direction of a central axis J shown in FIG. 1. In addition, in the following description, a positive side (+Z side) of the Z-axial direction is defined as "upper side" and a negative side (−Z side) of the Z-axial direction is defined as "lower side". Furthermore, the upper side and the lower side are directions which are merely used for explanation, and they do not limit the actual positional relation or direction. Also, unless otherwise explained, a direction (Z-axial direction) parallel to the central axis J is simply referred to as "axial direction" or "vertical direction", a radial direction centered on the central axis J is simply referred to as "radial direction", and a circumferential direction centered on the central axis J, that is, the axial circumference of the central axis J is simply referred to as "circumferential direction". Furthermore, in the following description, an expression of "when viewed in a plan view" means a state viewed in the axial direction.

Figure 1:
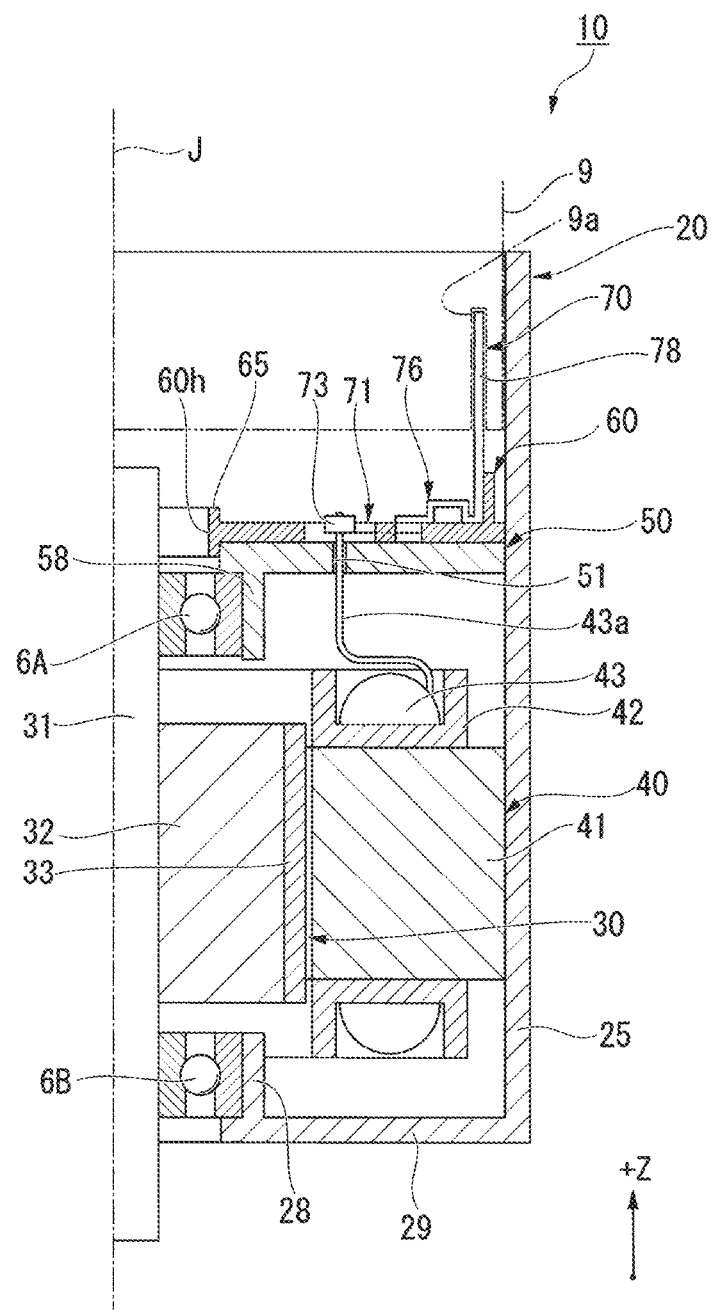
FIG. 1 is a cross-sectional view of a motor according to an example embodiment of the present disclosure.

FIG. 1 is a cross-sectional view of a motor 10 according to an example embodiment of the present disclosure. The motor 10 according to this example embodiment of the present disclosure is provided with a rotor 30, a stator 40, a housing 20, a bearing holder 50, an upper bearing 6A, a lower bearing 6B, and a bus-bar unit 60.

The rotor 30 rotates around a central axis J extending in a vertical direction. The rotor 30 has a shaft 31, a rotor core 32, and a rotor magnet 33. The shaft 31 is centered on the central axis J extending the vertical direction (axial direction) and is disposed along the central axis J. The shaft 31 is rotatably supported around the central axis J by the upper bearing 6A and the lower bearing 6B. The rotor core 32 is fixed to an outer circumferential surface of the shaft 31. The rotor magnet 33 is fixed to an outer circumferential surface of the rotor core 32.

The stator 40 is disposed around the central axis J in an annular or substantially annular shape. The stator 40 surrounds a radial-directional outer side of the rotor 30. The stator 40 faces the rotor 30 in a radial direction via a gap. The stator 40 has a stator core 41 in an annular or substantially annular shape, an insulator 42 mounted on the stator core 41, and a coil 43 mounted on the stator core 41 via the insulator 42. The coil 43 is configured by winding a coil wire 43a. The coil wire 43a is wound around teeth of the stator core 41 via the insulator 42. An end of the coil wire 43a is drawn upwardly and connected to the bus-bar unit 60.

The housing 20 has a cylindrical or substantially cylindrical shape that is open upwardly (+Z side). The housing 20 accommodates the rotor 30, the stator 40, the bearing holder 50, and the bus-bar unit 60. The housing 20 has a cylinder 25 and a bottom 29.

The cylinder 25 surrounds the stator 40 from a radial-directional outer side. In this example embodiment of the present disclosure, the cylinder 25 has a cylindrical or substantially cylindrical shape centered on the central axis J. The bottom 29 is located at a lower end of the cylinder 25. A lower bearing holding part 28 is provided at a center of the bottom 29 in a plan view. The housing 20 holds the lower bearing 6B in the lower bearing holding part 28.

The bearing holder 50 is located at an upper side (+Z side) of the stator 40. In addition, the bearing holder 50 is located at a lower side of bus-bar unit 60. That is, the bearing holder 50 is located between the stator 40 and the bus-bar unit 60 in the axial direction. When viewed in a plan view (XY plane), a shape of the bearing holder 50 is, for example, a circular or substantially circular shape which is concentric with the central axis J. The bearing holder 50 is held in the cylinder 25 of the housing 20 at an outer edge. An upper bearing holding part 58 is provided at a center of the bearing holder 50 when viewed in a plan view. The bearing holder 50 holds the upper bearing 6A in the upper bearing holding part 58.

The bearing holder 50 is provided with a first coil wire passing hole 51 penetrating the bearing holder in the axial direction. The coil wire 43a drawn from the stator 40 passes through the first coil wire passing hole 51 and is drawn upwardly.

When viewed in a plane view, a shape of the bus-bar unit 60 has a substantially circular shape which becomes widened in the radial direction. The bus-bar unit 60 is disposed at an upper side of the stator 40 and the bearing holder 50. The bus-bar unit 60 is fixed to, for example, an upper face of the bearing holder 50.

Figure 2:
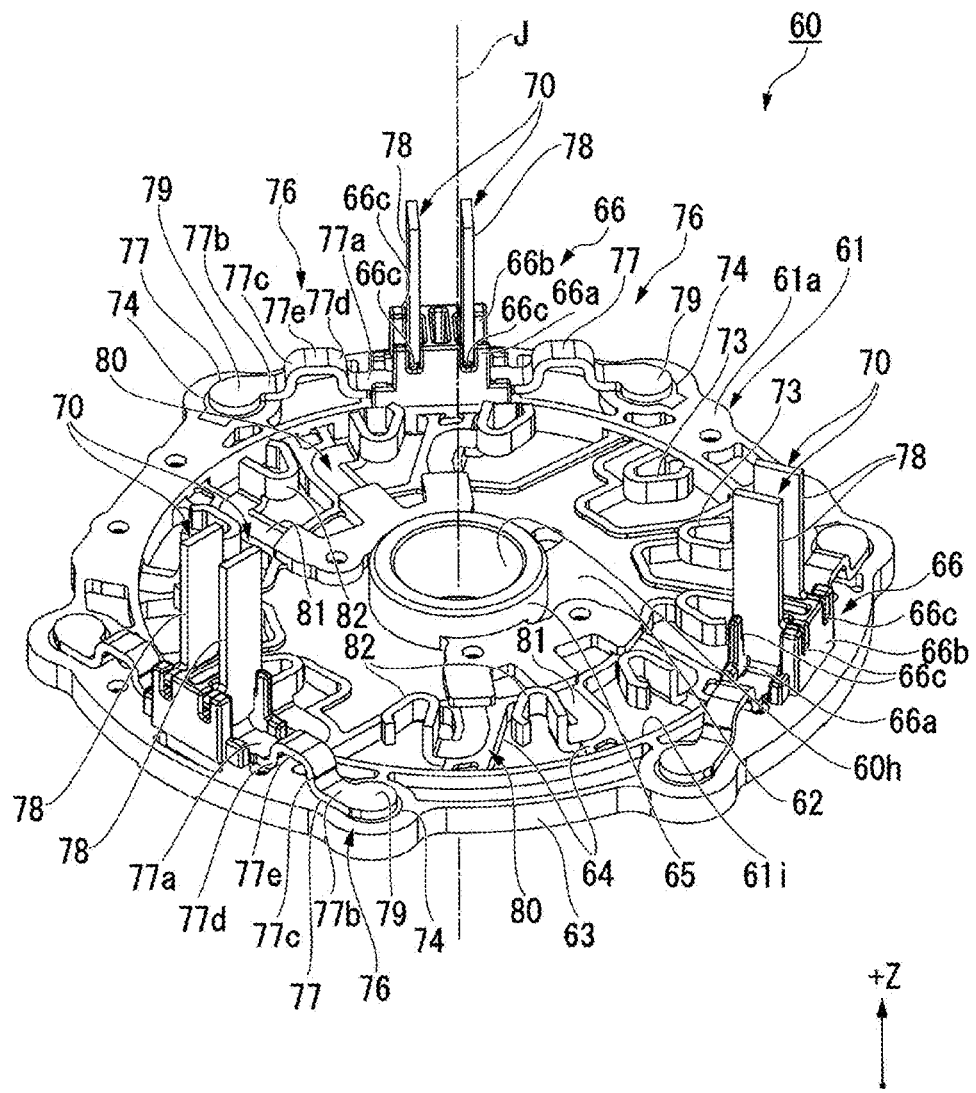
FIG. 2 is a perspective view of a bus-bar unit according to an example embodiment of the present disclosure.

FIG. 2 is a perspective view of the bus-bar unit 60.

Figure 3:
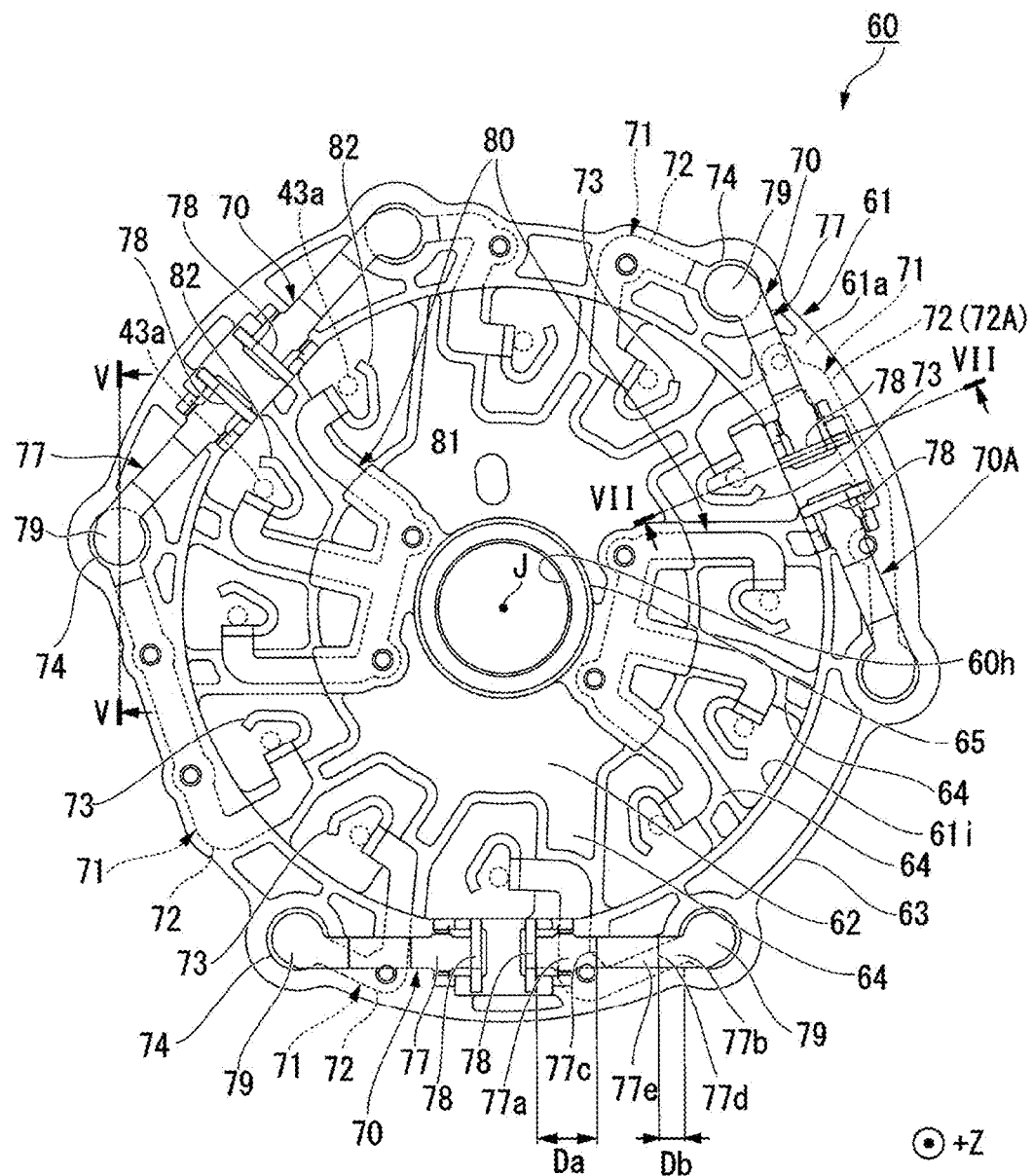
FIG. 3 is a plan view of a bus-bar unit according to an example embodiment of the present disclosure.
Figure 4:
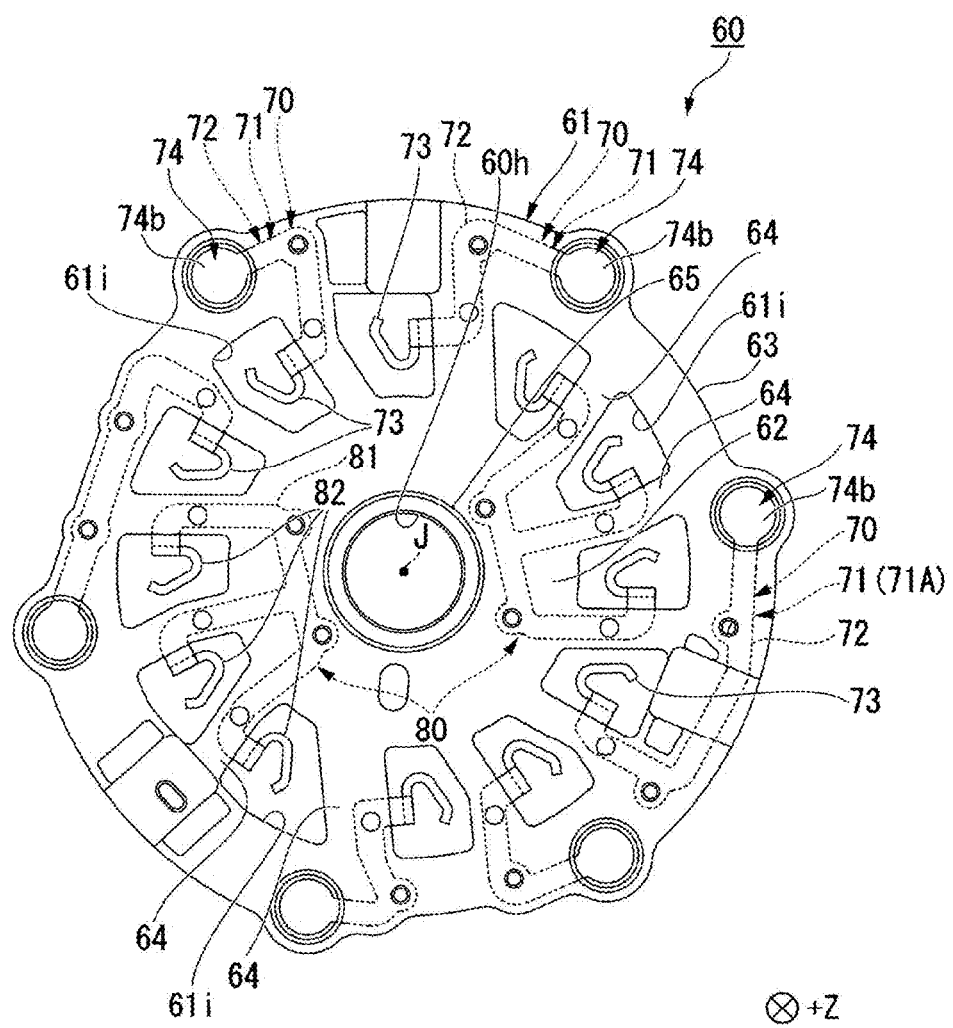
FIG. 4 is a bottom view of a bus-bar unit according to an example embodiment of the present disclosure.
Figure 5:
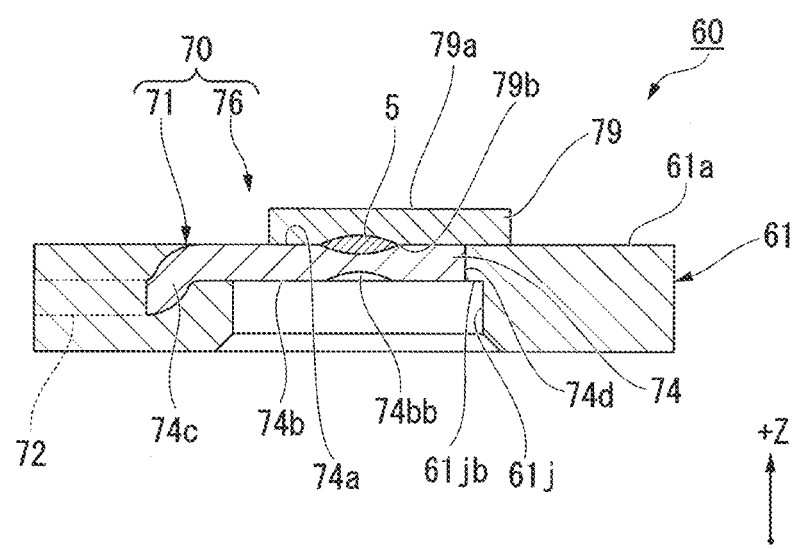
FIG. 5 is a cross-sectional view taken along line V-V in FIG. 3 and shows a junction provided on the bus-bar unit.

FIG. 3 is a plan view of the bus-bar unit 60. FIG. 4 is a bottom view of the bus-bar unit 60. FIG. 5 is a cross-sectional view of the bus-bar unit 60 taken along line V-V shown in FIG. 3.

As shown in FIG. 2, the bus-bar unit 60 has a plurality (six in this example embodiment of the present disclosure) of phase bus-bars (bus-bars) 70, a plurality (two in this example embodiment of the present disclosure) of neutral point bus-bars 80, a bus-bar holder 61.

The bus-bar holder 61 supports the phase bus-bar 70 and the neutral point bus-bar 80. The bus-bar holder 61 extends in a plate or substantially plate shape along a direction perpendicular to the axial direction. A lower face of the bus-bar holder 61 is in contact with the upper face of the bearing holder 50. The bus-bar holder 61 is made of, for example, an insulative material such as a resin and the like.

The bus-bar holder 61 has a circular plate 62 having a substantially circular shape when viewed in a plan view, an inner cylinder 65 located at a center of the circular plate 62 when viewed in a plan view, an annular part 63 having an annular or substantially annular shape and surrounding the circular plate 62 when viewed in a plan view, and a bridge part 64 extending in the radial direction to connect the circular plate 62 and the annular part 63.

The circular plate 62 is a circular plate centered on the central axis J and extending in a direction perpendicular to the central axis J. A part of the neutral point bus-bar 80 is embedded in the circular plate 62. A shaft passing hole 60h is provided at a center of the circular plate 62 when viewed in a plan view. The shaft passing hole 60h is located at a center of the bus-bar holder 61 when viewed in a plan view. When viewed in a plan view, a shape of the shaft passing hole 60h is a circular or substantially circular shape centered on the central axis J. The shaft 31 passes through the shaft passing hole 60h (see FIG. 1).

The inner cylinder 65 is provided around the shaft passing hole 60h. The inner cylinder 65 is a cylinder which is centered on the central axis J and surrounds the shaft passing hole 60h. The inner cylinder 65 surrounds the shaft 31 from a radial-directional outer side thereof. The inner cylinder 65 extends in the vertical direction with respect to the circular plate 62.

The annular part 63 extends in an annular or substantially annular shape along a circumferential direction. A part of the phase bus-bar 70 is embedded in the annular part 63. The annular part 63 has a terminal holder 66 for holding an external connection terminal 78 of the phase bus-bar 70 described later. That is, the bus-bar holder 61 has the terminal holder 66.

The bridge part 64 extends along the radial direction. In this example embodiment of the present disclosure, twelve (12) bridge parts 64 are provided on the bus-bar holder 61. Among the twelve bridge parts 64, a part of the phase bus-bars 70 is disposed on an upper side of the six bridge parts 64, and a part of the neutral bus-bars 80 is disposed on an upper side of the other six bridge parts 64.

A second coil wire passing 61i penetrating in the axial direction is provided between the bridge parts 64 arranged along the circumferential direction. A plurality of second coil wire passing holes 61i are provided along the circumferential direction. The coil wire 43a drawn from the coil 43 passes through the second coil wire passing hole 61i.

In the bus-bar holder 61, as described above, a part of the neutral bus-bars 80 is embedded in the circular plate 62 and a part of the phase bus-bars 70 is embedded in the annular part 63. That is, the bus-bar holder 61 is formed by embedding the neutral point bus-bar 80 and the phase bus-bar 70 and performing an insert molding.

The neutral point bus-bar 80 and the phase bus-bar 70 have a plate or substantially plate shape. The neutral point bus-bar 80 and the phase bus-bar 70 are connected to the coil wires 43a extending from the stator 40, respectively. As shown in FIG. 1, the coil wire 43a passes through the first coil wire passing hole 51 of the bearing holder 50 and the second coil wire passing hole 61i of the bus-bar holder 61, and is then drawn upwardly than the bus-bar holder 61.

In the motor 10, the plurality of coils 43 are connected in a star connection by the neutral point bus-bar 80 and the phase bus-bar 70 so as to form a three-phase circuit. In addition, the plurality of coils 43 may form a plurality of connection systems. Due to the above configuration, even if a failure occurs in any one of the connection systems, the current can be supplied to the motor 10. The plurality of connection systems are configured by the three-phase circuit in which the coils 43 included respectively in the connection systems are connected in a star connection.

As shown in FIG. 3, one pair of the neutral point bus-bars 80 are disposed on the opposite side in the radial direction with the central axis J being between the neutral point bus-bars 80. In this example embodiment of the present disclosure, one pair of the neutral point bus-bars 80 has the same or substantially same shape. One pair of the neutral point bus-bars 80 is disposed point-symmetrically with respect to the central axis J when viewed in a plan view.

The neutral point bus-bars 80 are formed of a plate material. Each of the neutral point bus-bars 80 has a bus-bar main body 81 and three coil wire connecting part 82.

The bus-bar main body 81 of the neutral point bus-bar 80 has an elongated plate or substantially plate shape extending along a direction perpendicular to the axial direction. A plate face of the bus-bar main body 81 is perpendicular to the vertical direction. In the bus-bar main body 81, the neutral point bus-bar 80 is embedded in the circular plate 62 of the bus-bar holder 61. The bus-bar main body 81 is branched in three directions from both circumferential-directional ends and a circumferential-directional central part, and protrudes into the three second coil wire passing holes 61i.

The coil wire connecting part 82 of the neutral point bus-bar 80 is located at a front end of a branch line of the bus-bar main body 81. Further, the coil wire connecting part 82 is disposed inside the second coil wire passing hole 61i of the bus-bar holder 61. The coil wire connecting part 82 breaks the coil wire 43a drawn from the stator 40, and is welded and connected to the coil wire 43a.

The phase bus-bar 70 has a first bus-bar piece 71 and a second bus-bar piece 76. The first bus-bar piece 71 and the second bus-bar piece 76 are jointed to each other so as to be electrically connected to each other. The first bus-bar piece 71 and the second bus-bar piece 76 are formed of different materials, respectively.

In the phase bus-bar 70 of this example embodiment of the present disclosure, one first bus-bar piece 71 is jointed to one second bus-bar piece 76. However, the phase bus-bar in which a plurality of first bus-bar pieces are jointed to one second bus-bar piece may be employed.

As described above, the bus-bar unit 60 of this example embodiment of the present disclosure has six phase bus-bars. Therefore, the bus-bar unit 60 of this example embodiment of the present disclosure has six first bus-bar pieces 71 and six second bus-bar pieces 76.

As shown in FIG. 3, the first bus-bar piece 71 is formed of a plate material. At least a part of the first bus-bar piece 71 is embedded in the bus-bar holder 61.

The first bus-bar piece 71 has a first piece main body 72, a coil wire connecting part 73, and a first junction terminal 74.

The first piece main body 72 has an elongated plate or substantially plate shape extending along a direction perpendicular to the axial direction. The first piece main body 72 connects the coil wire connecting part 73 and the first junction terminal 74. The first piece main body 72 is embedded in the annular part 63 of the bus-bar holder 61. That is, the first bus-bar piece 71 is embedded in the bus-bar holder 61.

Here, one phase bus-bar 70A among the plurality of phase bus-bars 70 is conceived. The conceived phase bus-bar 70A is the bus-bar disposed on the rightmost side in FIG. 3. A first piece main body 72A of this phase bus-bar 70A overlaps the external connection terminal 78 when viewed in the axial direction.

According to this example embodiment of the present disclosure, by disposing the external connection terminal 78 and the first piece main body 72A so as to overlap with each other in the axial direction, a degree of freedom in disposing the phase bus-bar 70A can be increased. As a result, it is possible to refrain the radial dimension of the bus-bar unit 60. In addition, since a part of the bus-bar holder 61 is interposed between the first piece main body 72A and the external connection terminal 78 in the axial direction, and the first piece main body 72A and the external connection terminal 78 are insulated from each other, the above disposition becomes possible. In this example embodiment of the present disclosure, since the first piece main body 72A is embedded in the bus-bar holder 61, the first piece main body 72A and the external connection terminal 78 are insulated from each other.

The coil wire connecting part 73 is located at one end of the first piece main body 72. The coil wire connecting part 73 is exposed from the bus-bar holder 61. The coil wire connector 73 is disposed inside the second coil wire passing hole 61i of the bus-bar holder 61. The coil wire connecting part 73 breaks the coil wire 43a and is welded and connected to the coil wire 43a.

The first junction terminal 74 is located at an end (the other end) in the opposite side of the coil wire connecting part 73 of the first piece main body 72. The first junction terminal 74 is jointed to the second bus-bar piece 76. The first junction terminal 74 has a circular or substantially circular shape when viewed in the axial direction.

As shown in FIG. 5, the first junction terminal 74 has an upper face (first junction face (junction face)) 74a oriented toward the upper side upwardly, a lower face (opposite face) 74b oriented toward the opposite side of the upper face 74a (that is, facing downward), and an outer circumferential face 74d connecting the upper face 74a and the lower face 74b. The upper face 74a and the lower face 74b of the first junction terminal 74 have a circular or substantially circular shape. As described later, the upper face 74a of the first junction terminal 74 is jointed to a lower face 79b of a second junction terminal 79 of the second bus-bar piece 76.

The first junction terminal 74 has a flexure 74c at a boundary between the first piece main body 72 and the first junction terminal 74. The flexure 74c is bent in a crank or substantially crank shape so as to offset the first junction terminal 74 upwardly with respect to the first piece main body 72. Due to the above configuration, an axial position of the upper face 74a of the first junction terminal 74 coincides with an axial position of an upper face 61a of the bus-bar holder 61, and the upper face 74a of the first junction terminal 74 is exposed from the bus-bar holder 61.

The bus-bar holder 61 is provided with a concavity 61j which is open downwardly from the lower face 74b of the first junction terminal 74. An axial position of the lower face 74b of the first junction terminal 74 coincides with an axial position of a lower face 61jb oriented toward a lower side of the concavity 61j. For this reason, the lower face 74b of the first junction terminal 74 is exposed from the bus-bar holder 61.

According to this example embodiment of the present disclosure, the first bus-bar piece 71 having the first junction terminal 74 is embedded in the bus-bar holder 61. Due to the above configuration, even when the first bus-bar piece 71 is firmly held in the bus-bar holder 61 and vibration occurs on the bus-bar unit 60, vibration is hardly amplified on the first junction terminal 74. As a result, it is possible to prevent the junctions 5 and 105 of the first junction terminal 74 and the second junction terminal 79 from being damaged by vibration. Further, since the first bus-bar piece 71 is exposed from the bus-bar holder 61 at the upper face 74a and the lower face 74b of the first junction terminal 74, the bus-bar holder 61 does not hinder a jointing process described later, and may simplify the jointing process.

In this example embodiment of the present disclosure, the outer circumferential face 74d of the first junction terminal is embedded in the bus-bar holder 61. That is, the first junction terminal 74 is embedded in the bus-bar holder 61 on the outer circumferential face 74d. Due to the above configuration, stability of holding of the first junction terminal 74 caused by the bus-bar holder 61 is enhanced, and damage to the junctions 5 and 105 in the case of vibration or the like may be more effectively refrained. In addition, since stability of holding of the first junction terminal 74 caused by the bus-bar holder 61 is enhanced, it is possible to perform stably the joining process of the first junction terminal 74 and the second junction terminal 79.

In this example embodiment of the present disclosure, the first junction terminal 74 is surrounded in the bus-bar holder 61 over an entire circumference when viewed in the axial direction. That is, the outer circumferential face 74d of the first junction terminal 74 is embedded in the bus-bar holder 61 over the entire circumference. Due to the above configuration, stability of holding of the first junction terminal 74 caused by the bus-bar holder 61 is further improved.

As shown in FIG. 2, the second bus-bar piece 76 is formed of a plate member. The second bus-bar piece 76 is located at an upper side of the annular part 63 of the bus-bar holder 61. As described above, the first bus-bar piece 71 is embedded inside the bus-bar holder 61, whereas a second piece main body 77 is located outside the bus-bar holder 61.

As shown in FIG. 3, the second bus-bar piece 76 has the second piece main body 77, the external connection terminal 78, and the second junction terminal 79.

The second junction terminal 79 is located at one end of the first piece main body 72. The second junction terminal 79 is jointed to the first bus-bar piece 71. The second junction terminal 79 has a circular or substantially circular shape when viewed in the axial direction. The second junction terminal 79 is located at an upper side of the first junction terminal 74. When viewed in the axial direction, the second junction terminal 79 overlaps the first junction terminal 74.

FIG. 5 is a cross-sectional view showing the junction 5 of the first junction terminal 74 and the second junction terminal 79 which are weld-jointed. As shown in FIG. 5, the second junction terminal 79 has an upper face 79a oriented toward the upper side, and the lower face (second junction face) 79b oriented toward the opposite side of the upper face 79a, i.e., the lower side. The lower face 79b of the second junction terminal 79 is axially opposite to and is in contact with the upper face 74a of the first junction terminal 74.

In this example embodiment of the present disclosure, the first junction terminal 74 and the second junction terminal 79 are weld-jointed. More specifically, the first junction terminal 74 and the second junction terminal 79 are jointed by projection welding. Projection welding is a type of resistance welding. Prior to the projection welding, a protrusion (projection) is formed on the upper face 74a of the first junction terminal 74 by press working. In addition, a concavity for forming the protrusion is formed on the lower face 74b of the first junction terminal 74. In this state, the first junction terminal 74 and the second junction terminal 79 vertically overlap with each other and are energized while pressures are applied from the upper side and the lower side such that resistance heat is concentrated and the protrusion is thus melted to form a welding part 6. That is, the welding part 6 is provided between the upper face 74a of the first junction terminal 74 and the lower face 79b of the second junction terminal 79. In addition, after forming the welding part 6, the lower face 74b of the first junction terminal 74 is in a state in which a concavity mark 74bb which is a trace of concavity is formed thereon.

Furthermore, in this example embodiment of the present disclosure, the case in which the concavity mark 74bb is provided on the lower face 74b of the first junction terminal 74 has been illustrated. However, when the protrusion (projection) is formed on the second junction terminal 79, the concavity mark 74bb is provided on the upper face 79a of the second junction terminal 79.

Figure 6:
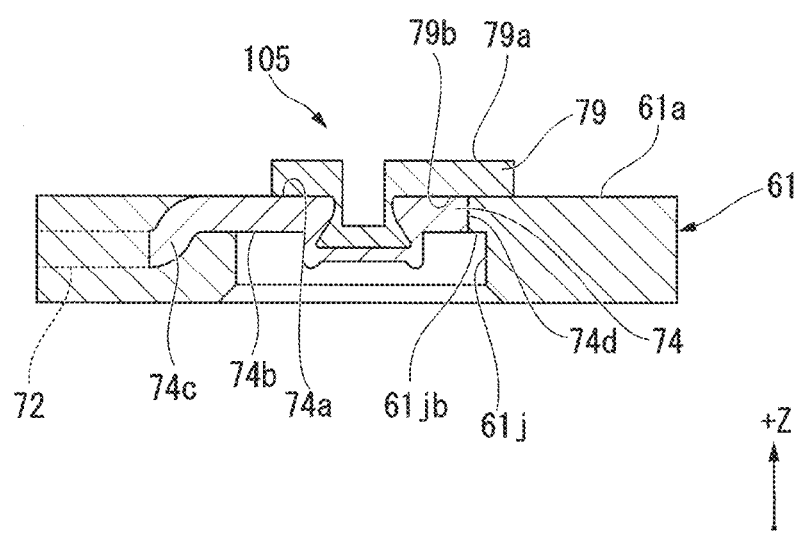
FIG. 6 is a cross-sectional view of a junction in a modified example corresponding to FIG. 5.

Further, the first junction terminal 74 and the second junction terminal 79 may be press-jointed. As one example of the press junction, a modified example in which the first junction terminal 74 and the second junction terminal 79 are jointed by the TOX (registered trademark) junction is illustrated. FIG. 6 is a cross-sectional view showing a junction 105 of the first junction terminal 74 and the second junction terminal 79 which have been press-jointed. In the TOX junction, while the first junction terminal 74 and the second junction terminal 79 are overlapped, a press working in which both terminals are sandwiched between an upper mold having a convexity in a cylindrical or substantially cylindrical shape and a lower mold with a concavity being provided is performed. The first junction terminal 74 and the second junction terminal 79 are plastically deformed and jointed by the press working as described above.

According to this example embodiment of the present disclosure and its modified example, the first junction terminal 74 and the second junction terminal 79 are welded by weld-jointing (FIG. 5) or press-jointing (FIG. 6). The weld-jointing and the press-joining are jointing methods that enable local jointing having high junction strength. In addition, the weld-jointing and the press-jointing are relatively inexpensive processes, and joining methods capable of jointing the first junction terminal 74 and the second junction terminal 79 which are formed of metal materials. That is, according to this example embodiment of the present disclosure and its modified example, by employing the weld-joining or the press-joining, the first junction terminal 74 and the second junction terminal 79 may be jointed with each other with high strength in an inexpensive manufacturing process.

As shown in FIG. 5 and FIG. 6, the first junction terminal 74 is exposed from the bus-bar holder 61 at the upper face 74a and the lower face 74b. Due to this configuration, the first junction terminal 74 and the second junction terminal 79 may be jointed by the weld-jointing or the press-jointing.

In this example embodiment of the present disclosure, the first junction terminal 74 and the second junction terminal 79 overlap with each other in the axial direction. However, the first junction terminal 74 and the second junction terminal 79 may overlap with each other in another direction, for example, in the radial direction or the like. In this case, the junction faces of the first junction terminal 74 and the second junction terminal 79 are oriented toward other directions such as the radial direction or the like. In addition, when the first junction terminal 74 and the second junction terminal 79 overlap with each other in the axial direction, an electrode for resistance welding (or a mold for press-jointing) may be pressed against the first junction terminal 74 and the second junction terminal 79 in the vertical direction such that it is possible to simplify a manufacturing apparatus.

In the bus-bar unit 60 of this example embodiment of the present disclosure, the plurality of first junction terminals 74 are disposed on the same virtual circle centered on the central axis J when viewed in the axial direction. In other words, a distance between the first junction terminal 74 and the central axis J is the same as that between each of remaining first junction terminals 74 and the central axis J when viewed in the axial direction. For this reason, in the jointing process of the first junction terminal 74 and the second junction terminal 79, by rotating the bus-bar unit 60 around the central axis J, it is possible to jointing the plurality of first junction terminals 74 to the second junction terminals 79, respectively, without moving the electrode for resistance welding (or the mold for press-jointing) in the radial direction, such that the joining process can be simplified. In addition, the second junction terminals 79 are disposed at the upper sides of the plurality of first junction terminals 74, respectively. For this reason, the plurality of second junction terminals 79 are also disposed on the same virtual circle centered on the central axis J when viewed in the axial direction.

As shown in FIG. 3, the external connection terminal 78 is located at one end (the other end) opposite to the second junction terminal 79 of the second piece main body 77. As shown in FIG. 1, the external connection terminal 78 is connected to an external device 9 for supplying electric power to the motor 10. The external connection terminal 78 extends upwardly with respect to the bus-bar holder 61.

The external connection terminal 78 is held on the terminal holder 66 of the bus-bar holder 61. Further, as described above, the second junction terminal 79 is jointed to the first junction terminal 74. That is, each of the second bus-bar pieces 76 is held at both lengthwise-directional ends thereof. For this reason, the second bus-bar piece 76 is very stable, and even when vibration is applied to the motor 10, it is possible to prevent the second bus-bar piece 76 from being separated from the bus-bar unit 60.

Six external connection terminals 78 are provided on the bus-bar unit 60. One pair of the external connection terminals 78 is set as one set, and six external connection terminals 78 are held in three terminal holders 66. One pair of the external connection terminals 78 in each set held in three terminal holders 66 is disposed rotation-symmetrically about the central axis J. The external connection terminal 78 is disposed with a direction perpendicular to the axial direction being as a plate thickness direction. One pair of the external connection terminals 78 held in one terminal holder 66 is disposed in the same plate thickness direction.

As shown in FIG. 2, the terminal holder 66 has a first wall (wall) 66a and a second wall (wall) 66b. The first wall 66a and the second wall 66b protrude upwardly along a widthwise-directional end of the external connection terminal 78. Further, the first wall 66a and the second wall 66b extend in a direction perpendicular to the radial direction. The first wall 66a and the second wall 66b are arranged in the radial direction. The first wall 66a is located in the radial-directional inner side with respect to the second wall 66b.

Each of the first wall 66a and the second wall 66b is provided with a pair of notches 66c. One pair of the notches 66c is open upwardly. One pair of the notches 66c of the first wall 66a and one pair of notches 66c of the second wall 66b overlap each other when viewed in the radial direction. One external connection terminal 78 is inserted into the notch 66c of the first wall 66a and the notch 66c of the second wall 66b which overlap each other when viewed in the radial direction. That is, according to this example embodiment of the present disclosure, the terminal holder 66 holds the external connection terminal 78 by sandwiching the external connection terminal 78 in the plate thickness direction. Due to this configuration, it is possible to easily refrain the external connection terminal 78 from being separated in the plate thickness direction. Further, since the notch 66c is open upwardly, the external connection terminal 78 may be easily assembled to the bus-bar holder 61 by inserting the external connection terminal 78 into the notch 66c from the upper side.

Figure 7:
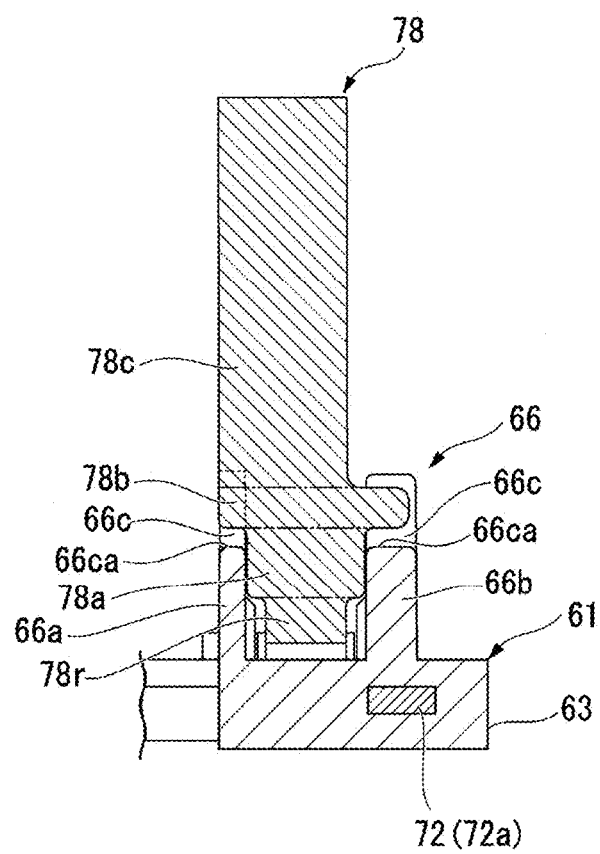
FIG. 7 is a cross-sectional view taken along line VII-VII in FIG. 3.

FIG. 7 is a cross-sectional view taken along line VII-VII in FIG. 3. The external connection terminal 78 has a root part 78r, a first part 78a, a second part 78b, and a third part 78c. The root part 78r, the first part 78a, the second part 78b, and the third part 78c are arranged in this order from the lower side towards the upper side. Each of a boundary line between the root part 78r and the first part 78a, a boundary line between the first part 78a and the second part 78b, and a boundary line between the second part 78b and the third part 78c extends in a plate widthwise direction of the external connection terminal 78.

The plate widths of the root part 78r, the first part 78a, the second part 78b, and the third part 78c are different from each other. The plate width of the external connection terminal 78 increases in the order of the root part 78r, the first part 78a, the third part 78c, and the second part 78b. In addition, the axial dimension of the external connection terminal 78 increases in the order of the second part 78b, the root part 78r, the first part 78a, and the third part 78c.

The root part 78r is located at a lower end of the external connection terminal 78. The root part 78r, a part of the external connection terminal 78, has the narrowest plate width. The root part 78r is curved at a lower end toward the second piece main body 77.

The first part 78a is located in the upper side of the root part 78r. The first part 78a protrudes towards both widthwise-directional sides with respect to the root part 78r. Therefore, the first part 78a has a plate width greater than that of the root part 78r.

The second part 78b is located in the upper side of the first part 78a. The second part 78b protrudes towards both widthwise-directional sides with respect to the first part 78a. Therefore, the second part 78b has a plate width greater than that of the first part 78a. The second part 78b, a part of the external connection terminal 78, has the largest plate width.

The third part 78c is located in the upper side of the second part 78b. Both widthwise-directional sides of the third part 78c are concave with respect to the second part 78b. The third part 78c has a plate width smaller than that of the second part 78b. As shown in FIG. 1, the external connection terminal 78 is inserted into a socket 9a of the external device 9 at the third part 78c.

The first wall 66a and the second wall 66b of the terminal holder 66 are disposed on both widthwise-directional sides of the root part 78r and the first part 78a. That is, the first wall 66a and the second wall 66b sandwich the root part 78r and the first part 78a from both widthwise-directional sides. Due to this configuration, the movement of the external connection terminal 78 along the widthwise direction is refrained by the terminal holder 66.

The external connection terminal 78 is inserted into and held in the notch 66c of the terminal holder 66 at the second part 78b. That is, the second part 78b is inserted into the notch 66c. The notch 66c is provided with a bottom face 66ca oriented towards the upper side. A gap is provided between the bottom face 66ca and the second part 78b. For this reason, the notch 66c does not restrict a downward movement of the external connection terminal while holding the external connection terminal 78. Stress applied to the external connection terminal 78 when the external connection terminal 78 is inserted into the socket 9a of the external device 9 can be released to the second piece main body 77 via the curved root part 78r. For this reason, since the terminal holder 66 does not receive stress which is applied when the external connection terminal 78 is inserted into the socket 9a, it is possible to make the terminal holder 66 to be in a simple structure. In addition, stress released to the second piece main body 77 is absorbed in crank parts 77c and 77d described later, and is thus refrained from being transmitted to the second junction terminal 79.

The second piece main body 77 has an elongated plate or substantially plate shape that extends linearly along the circumferential direction when viewed in the axial direction. The second piece main body 77 connects the external connection terminal 78 and the second junction terminal 79.

As shown in FIG. 2, the second piece main body 77 has a first extension 77a, a second extension 77b, one pair of the crank parts 77c and 77d, and an intermediate part 77e located between one pair of the crank parts 77c and 77d.

The first extension 77a extends along a direction perpendicular to the axial direction. In addition, the first extension 77a is connected to the external connection terminal 78, and linearly extends from the external connection terminal 78 towards the second junction terminal 79. The first extension 77a is disposed with the axial direction being as the plate thickness direction.

The second extension 77b extends along a direction perpendicular to the axial direction. In addition, the second extension 77b is connected to the second junction terminal 79, and extends linearly from the second junction terminal 79 towards the external connection terminal 78. The second extension 77b is disposed with the axial direction being as the plate thickness direction. In this example embodiment of the present disclosure, an axial position of the second extension 77b coincides with an axial position of the first extension 77a.

Each of the crank parts 77c and 77d is located between the first extension 77a and the second extension 77b, respectively. The crank parts 77c and 77d are bent in the plate thickness direction. In addition, the crank parts 77c and 77d are bent in the upward side in a crank or substantially crank shape. More specifically, the crank parts 77c and 77d have a part connected to the first extension 77a or the second extension 77b and bent so as to be risen in the axial direction from a horizontal direction, a part extending along the axial direction, and a part bent in the horizontal direction from the axial direction at an upper end of a part extending along the axial direction and then connected to the intermediate part 77e.

The intermediate part 77e connects one pair of the crank parts 77c and 77d. The intermediate part 77e extends along a direction perpendicular to the axial direction. The intermediate part 77e is disposed to be shifted from the first extension 77a and the second extension 77b in the axial direction. In this example embodiment of the present disclosure, the intermediate part 77e is located at the upper side of the first extension 77a and the second extension 77b.

However, the intermediate part 77e may be located at the lower side of the first extension 77a and the second extension 77b. In this case, one pair of the crank parts 77c and 77d are oriented toward the lower side and bent in a crank or substantially clank shape.

As shown in FIG. 1, when the external connection terminal 78 is inserted into or pulled out from the socket 9a of the external device 9, there is a case in which stress is transmitted to the second piece main body 77 due to rattling of the external connection terminal 78. When this stress is transmitted to the second junction terminal 79, there is a concern that the junctions 5 and 105 of the first junction terminal 74 and the second junction terminal 79 may be damaged. According to this example embodiment of the present disclosure, the crank parts 77c and 77d bent in a crank or substantially crank shape in the plate thickness direction are provided between the first extension 77a and the second extension 77b. Due to this configuration, stress transmitted from the external connection terminal 78 to the second piece main body 77 can be absorbed by elastic deformation of the crank parts 77c and 77d. As a result, transmission of stress to the second junction terminal 79 is refrained such that it is possible to refrain the junctions 5 and 105 of the first junction terminal 74 and the second junction terminal 79 from being damaged.

Furthermore, in this example embodiment of the present disclosure, two crank parts 77c are provided between the first extension 77a and the second extension 77b. Due to this configuration, the effect of reducing stress transmitted to the second junction terminal 79 is enhanced. However, even when one crank part 77c is provided between the first extension 77a and the second extension 77b, the above-described stress reduction effect can be obtained. Further, according to this example embodiment of the present disclosure, by providing two crank parts 77c, it is possible to coincide the axial positions of the first extension 77a and the second extension 77b with each other.

As shown in FIG. 3, in this example embodiment of the present disclosure, a length dimension of the first extension 77a in the longitudinal direction is greater than a length dimension of the second extension 77b in the longitudinal direction. That is, a distance Da from the external connection terminal 78 to the crank part 77d is longer than a distance Db from the second junction terminal 79 to the crank part 77c. As described above, by disposing the external connection terminal 78 and the crank part 77d as apart as possible, the effect of absorbing stress in the crank part 77d can be enhanced.

In addition, in this example embodiment of the present disclosure, the first extension 77a and the second extension 77b are disposed with the axial direction as the plate thickness direction. However, the first extension 77a and the second extension 77b may be disposed with a direction perpendicular to the axial direction being as the plate thickness direction. In this case, the crank part 77c is bent in the plate thickness direction perpendicular to the axial direction.

In this example embodiment of the present disclosure, both the first bus-bar piece 71 and the second bus-bar piece 76 are formed of a plate member and are formed by a press working. In this example embodiment of the present disclosure, the phase bus-bar 70 is divided into the first bus-bar piece 71 and the second bus-bar piece 76. For this reason, even when the phase bus-bar 70 has a complicated shape, it is possible to increase product yield by increasing the number of pieces obtained from the plate member.

According to this example embodiment of the present disclosure, the first bus-bar piece 71 having the coil wire connecting part 73 and the second bus-bar piece 76 having the external connection terminal 78 are formed of different materials. In this example embodiment of the present disclosure, the material characteristics required for the external connection terminal 78 and the coil wire connecting part 73 differ from each other. The external connection terminal 78 is formed to be long in the axial direction in order to be connected to the external device 9. For this reason, it is preferable to form the external connection terminal 78 from a highly rigid material. Meanwhile, since the coil wire connecting part 73 is formed in a complicated shape, it is preferable to make the coil wire connecting part 73 to be formed of a material of low rigidity so that punching stress and bending stress caused by the press gets smaller. That is, it is preferable that the material forming the second bus-bar piece 76 has higher rigidity than the material forming the first bus-bar piece 71.

Further, as a result of emphasizing any material property among the material properties required for the external connection terminal 78 and the coil wire connecting part 73, there is a case where expensive materials should be used for the entire phase bus-bar 70. According to this example embodiment of the present disclosure, by configuring the phase bus-bar 70 to be divided into the first bus-bar piece 71 and the second bus-bar piece 76, it is possible to manufacture the phase bus-bar 70 at low cost as a whole while satisfying the material property required for each part.

Figure 8:
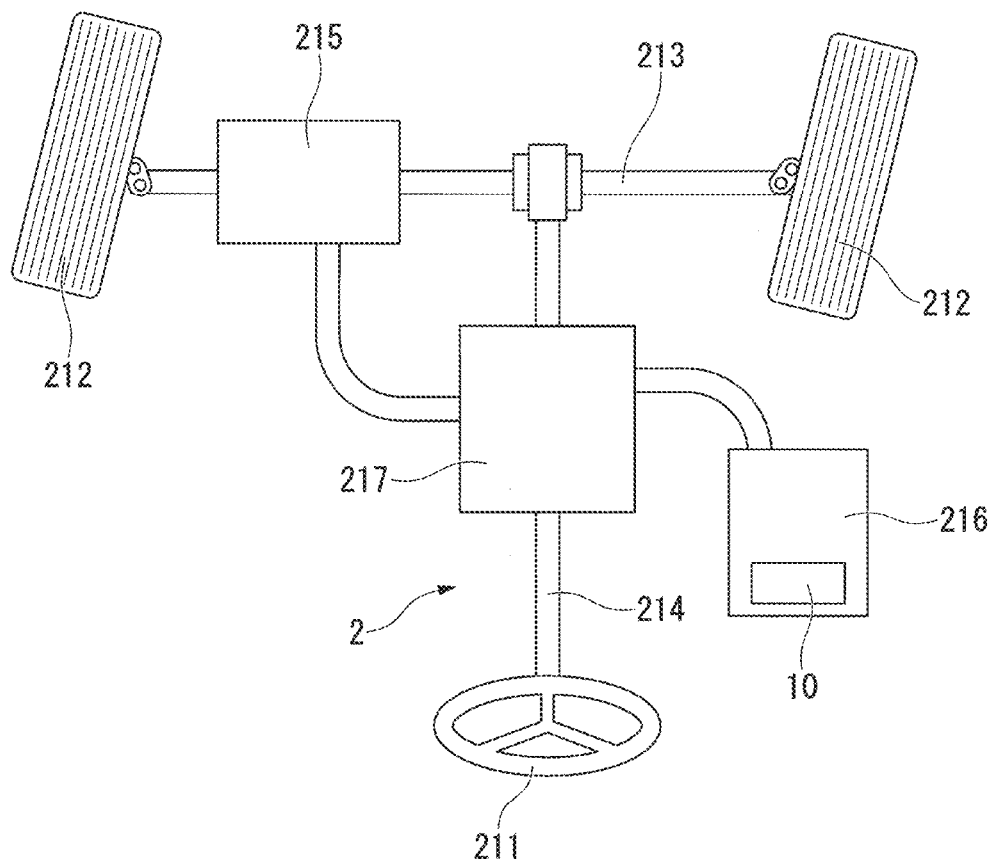
FIG. 8 is a schematic view of an electric power steering device according to an example embodiment of the present disclosure.

Next, an example embodiment of a device in which the motor 10 according to an example embodiment of the present disclosure is mounted is described. FIG. 8 is a schematic view of an electric power steering device 2 in which the motor 10 according to this example embodiment of the present disclosure is mounted. The electric power steering device 2 is mounted on a steering mechanism of a vehicle wheel 212 of a vehicle. The electric power steering device 2 is a device that reduces a steering force using hydraulic pressure. The electric power steering device 2 is provided with the motor 10, a steering shaft 214, an oil pump 216, and a control valve 217.

The steering shaft 214 transmits an input from a steering 211 to an axle 213 having the vehicle wheel 212. The oil pump 216 generates hydraulic pressure in a power cylinder 215 which transmits a driving force generated by hydraulic pressure to the axle 213. The control valve 217 controls oil in the oil pump 216. In the electric power steering device 2, the motor 10 is mounted as a drive source of the oil pump 216. In addition, the motor 10 of this example embodiment of the present disclosure is not limited to the electric power steering device 2 and may be mounted on any device.

For example, in the above-described example embodiment of the present disclosure, the case where the bus-bar unit 60 is disposed at the upper side of the bearing holder 50 has been described. However, the bus-bar unit 60 may be disposed between the bearing holder 50 and the stator 40 in the axial direction.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A bus-bar unit provided at an upper side of a stator with an annular shape around a central axis extending in a vertical direction, the bus-bar unit comprising;
   a plurality of bus-bars; and
   a bus-bar holder supporting the plurality of bus-bars; wherein
   the bus-bar includes a first bus-bar piece and a second bus-bar piece;
   the first bus-bar piece includes a coil wire connecting portion connected to a coil wire drawn from the stator, and a first junction terminal joined to the second bus-bar piece;
   the second bus-bar piece includes an external connection terminal connected to an external device, a second junction terminal joined to the first bus-bar piece, and a second piece main body connecting the external connection terminal and the second junction terminal;
   the second bus-bar piece includes a plate; and
   the second piece main body includes a first extension extending from the external connection terminal along a direction perpendicular to an axial direction, a second extension extending from the second junction terminal along the direction perpendicular to the axial direction, and a crank portion located between the first extension and the second extension and bent in a crank shape in a plate thickness direction.

2. The bus-bar unit of claim 1, wherein the second piece main body includes a pair of the crank portions and an intermediate portion connecting the pair of the crank portions and extending along the direction perpendicular to the axial direction.

3. The bus-bar unit of claim 1, wherein the first extension and the second extension are disposed with the axial direction being a plate thickness direction.

4. The bus-bar unit of claim 1, wherein the second piece main body extends linearly when viewed in the axial direction, and a distance between the external connection terminal and the crank portion is longer than a distance between the second junction terminal and the crank portion.

5. The bus-bar unit of claim 1, wherein the external connection terminal extends upwardly with respect to the bus-bar holder and the bus-bar holder includes a terminal holder to hold the external connection terminal.

6. The bus-bar unit of claim 5, wherein the external connection terminal is disposed with the direction perpendicular to the axial direction being a plate thickness direction, and the terminal holder sandwiches the external connection terminal in the plate thickness direction.

7. The bus-bar unit of claim 6, wherein
   the external connection terminal includes a first portion and a second portion located at an upper side of the first portion and having a plate width greater than that of the first portion;
   the terminal holder includes a wall extending upwardly along a width-directional end of the external connection terminal;
   the wall is provided with a notch which is open upwardly and is to allow the second portion to be inserted thereinto; and
   a gap is located between a bottom surface of the notch and the second portion.

8. The bus-bar unit of claim 1, wherein at least a portion of the first bus-bar piece is embedded in the bus-bar holder.

9. The bus-bar unit of claim 1, wherein the first bus-bar piece includes a first piece main body connecting the coil wire connecting portion and the first junction terminal, and the first piece main body of at least some bus-bars of the plurality of the bus-bars overlaps the external connection terminal when viewed in the axial direction.

10. The bus-bar unit of claim 1, wherein the first bus-bar piece is made of a material which differs from a material from which the second bus-bar piece is made.

11. A motor comprising:
the bus-bar unit according to claim 1;
the stator; and
a rotor facing the stator in a radial direction via a gap.

* * * * *